US008811134B1

(12) United States Patent
Sutardja et al.

(10) Patent No.: US 8,811,134 B1
(45) Date of Patent: *Aug. 19, 2014

(54) CIRCUITS, ARCHITECTURES, APPARATUSES, SYSTEMS, ALGORITHMS AND METHODS AND SOFTWARE FOR OPTIMUM POWER CALIBRATION FOR OPTICAL DISC RECORDING

(71) Applicant: Marvell International Ltd., Hamilton (BM)

(72) Inventors: Pantas Sutardja, Los Gatos, CA (US); William R. Foland, Jr., Golden, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,551

(22) Filed: Oct. 2, 2013

Related U.S. Application Data

(63) Continuation of application No. 12/352,950, filed on Jan. 13, 2009, now Pat. No. 8,559,284, which is a continuation-in-part of application No. 11/646,098, filed on Dec. 26, 2006, now Pat. No. 7,839,739.

(60) Provisional application No. 61/027,992, filed on Feb. 12, 2008, provisional application No. 61/020,887, filed on Jan. 14, 2008, provisional application No. 60/776,588, filed on Feb. 24, 2006.

(51) Int. Cl.
*G11B 17/00* (2006.01)
*G11B 5/09* (2006.01)
*G11B 19/00* (2006.01)

(52) U.S. Cl.
USPC ............. 369/47.53; 369/59.12; 369/47.5

(58) Field of Classification Search
USPC ................. 369/47.53, 59.12, 47.5
See application file for complete search history.

(56) References Cited

U.S. PATENT DOCUMENTS

| 5,513,166 | A | 4/1996 | Tokumitsu et al. |
| 6,101,159 | A | 8/2000 | Shoji et al. |

(Continued)

FOREIGN PATENT DOCUMENTS

| JP | A-04-137223 | 5/1992 |
| JP | A-05-028495 | 2/1993 |

(Continued)

OTHER PUBLICATIONS

Sep. 23, 2013 Office Action issued in Taiwanese Patent Application No. 96105647 (with translation).

(Continued)

*Primary Examiner* — Aneeta Yodichkas

(57) ABSTRACT

Methods, software, and apparatuses for reading from and/or writing to an optical storage medium. The methods generally include steps for reading a region of an optical storage medium to produce a readback signal, processing predetermined pattern data to produce one or more measurement instructions, measuring one or more characteristics of the readback signal in response to the measurement instructions to produce one or more measurement results, and further processing the readback signal in accordance with one or more of the measurement results. Thus, the ability to flexibly set test parameters and to quickly and accurately test the write characteristics of a recordable or re-writable optical storage medium is provided.

20 Claims, 10 Drawing Sheets

(56) References Cited

U.S. PATENT DOCUMENTS

| | | | |
|---|---|---|---|
| 6,345,033 | B1 | 2/2002 | Hayashi |
| 6,891,565 | B1 | 5/2005 | Dieterich |
| 6,975,572 | B2 | 12/2005 | Matsumoto |
| 7,068,579 | B2 | 6/2006 | Tasaka et al. |
| 2003/0115534 | A1 | 6/2003 | Kojima et al. |
| 2003/0151994 | A1 | 8/2003 | Tasaka et al. |
| 2004/0008599 | A1 | 1/2004 | Hogan |
| 2004/0017752 | A1 | 1/2004 | Furumiya et al. |
| 2004/0160874 | A1* | 8/2004 | Hwang et al. ............... 369/47.53 |
| 2005/0058034 | A1 | 3/2005 | Ando et al. |
| 2005/0174906 | A1 | 8/2005 | Narumi et al. |
| 2005/0237884 | A1 | 10/2005 | Yanagawa |
| 2006/0067185 | A1 | 3/2006 | Ueki |
| 2006/0083135 | A1 | 4/2006 | Minemura |
| 2006/0215527 | A1 | 9/2006 | Uchida et al. |
| 2007/0121461 | A1 | 5/2007 | Kobayashi et al. |
| 2007/0165501 | A1 | 7/2007 | Iida et al. |

FOREIGN PATENT DOCUMENTS

| | | |
|---|---|---|
| JP | A-05-238495 | 9/1993 |
| JP | A-06-309669 | 11/1994 |
| JP | A-10-055540 | 2/1998 |
| JP | A-10-320777 | 12/1998 |
| JP | A-2000-123369 | 4/2000 |
| JP | A-2001-101807 | 4/2001 |
| JP | A-2003-151210 | 5/2003 |
| WO | WO 02/089123 | 11/2002 |
| WO | WO 2005/029479 A1 | 3/2005 |
| WO | WO 2007/138479 A2 | 12/2007 |

OTHER PUBLICATIONS

William R. Foland Jr., "*Circuits, Architectures, Apparatuses, Systems, Algorithms and Methods and Software for Timing Calibration for Optical Disc Recording,*" cited in Feb. 26, 2009 International Search Report issued in International Application No. PCT/US2009/1030878, 2 pages.

William R. Foland Jr., "*Circuits, Architectures, Apparatuses, Systems, Algorithms and Methods and Software for Timing Calibration for Optical Disc Recording,*" cited in Feb. 26, 2009 Written Opinion issued in International Application No. PCT/US2009/1030878, 5 pages.

Mar. 11, 2013 Office Action issued in Chinese Patent Application No. 200980102182.0 (with translation).

Jun. 21, 2010 Office Action issued in Korean Patent Application No. Oct. 2008-7022833.

* cited by examiner

CIRCUITS, ARCHITECTURES, APPARATUSES, SYSTEMS, ALGORITHMS AND METHODS AND SOFTWARE FOR OPTIMUM POWER CALIBRATION FOR OPTICAL DISC RECORDING

INCORPORATION BY REFERENCE

This application is a continuation of U.S. application Ser. No. 12/352,950, filed on Jan. 13, 2009, issued as U.S. Pat. No. 8,559,284 on Oct. 15, 2013, which is a continuation-in-part of U.S. application Ser. No. 11/646,098, filed Dec. 26, 2006, which issued as U.S. Pat. No. 7,839,739 on Nov. 23, 2010, and claims priority under 35 U.S.C. §119(e) to U.S. Provisional Application No. 60/776,588, filed Feb. 24, 2006, U.S. Provisional Application No. 61/027,992, filed Feb. 12, 2008, and U.S. Provisional Application No. 61/020,887, filed Jan. 14, 2008. The disclosures of the applications referenced above are incorporated herein by reference in their entireties.

FIELD OF THE INVENTION

The present invention generally relates to the field of writing to an optical storage medium. More specifically, embodiments of the present invention pertain to methods and apparatuses for calibration of optimal writing characteristics for optical storage media.

DISCUSSION OF THE BACKGROUND

Optical storage technology comprises a wide and growing variety of disc and application specifications. Disc specifications include, for example, CD-ROM and DVD-ROM for pre-recorded discs, CD-R, DVD-R, and DVD+R for write-once discs, and CD-RW, DVD-RW, DVD-RAM, and DVD+RW for rewritable discs. The disc format specifications generally define the physical characteristics of the disc (e.g., mechanical properties, optical signal characteristics, physical arrangement, writing methods, and testing conditions). Application specifications include DVD-Video for video content, DVD-Audio for audio content, and DVD-VR and DVD+VR for real-time video recording (e.g., in camcorders and personal video recorders [PVRs]).

In many optical disc specifications, an optical disc may comprise two areas, including a user data area and a disc information (lead-in) area. The user data area is generally used to write application data, including video, audio, information tables, file system data, etc. The disc information (lead-in) area generally includes data such as disc size, disc type, disc layout, etc. In some optical disc specifications (e.g., CD-R, DVD-R and DVD+R), the disc generally can be written only once. In other disc specifications or formats (e.g., CD-R/W, DVD+RW), data may be written to the disc more than once.

Optical storage media generally store data as a sequence (e.g., a continuous track) of "pits" (or "marks") and "lands" (or "space") on a data-bearing surface that is made reflective by the application of a metallic layer during manufacture. The "lands" are generally parts of the track that are not pits. Pits in read-only storage media are generally molded into the data bearing surface when the discs are formed. Recordable and re-writable discs are generally produced as blanks, and have only a preformed groove or "pre-groove" (together with a limited amount of embossed data in most cases) included during molding. Data is stored on recordable or re-writable optical storage media using the same pit-land principle, however the pits are generally added by "burning" a special phase-change material layer applied to the disc substrate. In order to write to a recordable or re-writable disc, an optical pick-up head of an optical disc is generally equipped with a higher power write laser in addition to the read laser. Alternatively, one laser can generally perform both functions by operating at lower power output for read operations, and a range of higher power outputs for write operations.

The amount of power used to burn pit features is critical to the shape of those features. The geometry of the shape of the pit features affects the read-back performance of read-back systems. Recordable and re-writable optical storage media are produced by a wide variety of vendors using different materials. Thus, an appropriate writing power level for one medium may be too high or too low for another medium, even if both media are manufactured in accordance with the same specification. Therefore, most optical storage medium specifications include some facility for a vendor to specify an optimal power level. However, even the vendor specified power level may be suboptimal due to normal process variations in the medium and/or the recording device or operational variations in the recording device. Therefore, most optical storage medium specifications also define one or more areas of the media for performing optimal power calibration (OPC) by writing data at various power levels and read back the data to determine an optimal writing power level. The amount of space available for OPC operations may be limited, and the OPC operations may need to be run multiple times if data is written to the medium in multiple sessions and/or on using multiple different recording devices on the same medium. Consequently, it is desirable for optical storage medium recording devices to obtain the most accurate calibration data possible.

Furthermore, conventional methods and devices for reading from an optical storage medium perform timing recovery to synchronize reading operations with the data read back from the medium. Timing recovery may be used, for example, to determine which sample and/or samples in a readback signal correspond to the data stored on the medium. When conventional timing recovery makes an incorrect decision, the readback signal may be misinterpreted. During OPC reading operations it is particularly important to correctly synchronize with the readback signal so that calibration measurements are accurate. Therefore, it is also desirable to provide for effective correction of a readback signal (e.g., reduction of jitter in time and/or amplitude) while reading data that may have been written under a variety of conditions (e.g., calibration pattern data written to the optical storage medium using several different writing power levels, timing offsets, etc.).

SUMMARY

Embodiments of the present invention relate to methods, software, and apparatuses for reading from and/or writing two an optical storage medium. The methods generally include steps for reading a region of an optical storage medium to produce a readback signal, processing predetermined pattern data to produce one or more measurement instructions, measuring one or more characteristics of the readback signal in response to the measurement instructions to produce one or more measurement results, and further processing the readback signal in accordance with one or more of the measurement results.

The data read from the optical storage medium generally includes the predetermined pattern data. The pattern data is generally known prior to reading from the medium, so that the expected shape of the readback signal can be predicted. Thus, the method may include writing the pattern data to the region of the optical disc before reading it.

In a further embodiment, the method includes writing the pattern data to the region of the optical storage medium in accordance with calibration instructions. The calibration instructions are generally synchronized with the pattern data. Thus, the method may include receiving a bitstream that includes the calibration instructions and the pattern data. For example, the bitstream may have the calibration instructions superimposed on the pattern data.

In some embodiments, the method may include changing a test value for one or more writing characteristics in response to the instructions, and writing some or all of the pattern data to the optical storage medium in accordance with the test value. Thus, one or more patterns may be written to the medium using multiple write characteristics.

Embodiments of the method may also include measuring one or more of the characteristics of the readback signal in accordance with the calibration instructions (e.g., by processing the instructions along with the pattern data to produce the measurement instructions) and calculating a writing characteristic for writing data to the optical storage medium (e.g., an optimal power level, timing offset, etc.) from one or more of the measurement results. For example, the method may include comparing one or more of the measurement results to one or more expected values based on the pattern data. In a further embodiment, the method may include correlating one or more of the measurement results with one or more of the calibration instructions (e.g., correlating the results with power levels or other characteristics set by the instructions during writing). Alternatively, the method may include correlating one or more of the measurement results with one or more run lengths in the pattern data.

In another embodiment, processing the pattern data may include analyzing the pattern data to find useful measurement locations. For example, the pattern data may be analyzed to find particular run-lengths, mark/space combinations, etc. In some embodiments, at least one of the measurement instructions comprises a guide edge measurement instruction. Thus, the method may include producing the guide edge instructions to correspond to a transition in the mark/space combination. In one exemplary embodiment, the guide edge instruction may correspond to a transition between a 6T mark and a 6T space (or vice versa) in the pattern data.

The guide edge instruction may be synchronized with an expected transition in the readback signal (e.g., where the readback signal includes the pattern data). Measuring the one or more characteristics of the readback signal may include measuring a time offset between the guide edge instruction and a transition in the readback signal (e.g., where the readback signal should have a transition, as determined by the pattern data).

In an exemplary embodiment, the method includes adjusting an output of a phase locked loop (PLL) in accordance with the time offset (e.g., to speed up or slow down the PLL to reduce jitter in the readback signal). For example, the method may include storing a plurality of time offset measurements in accordance with the guide edge instructions and calculating the PLL adjustment in accordance with the stored time offset measurements. Measuring a time offset in the readback signal may, for example, include measuring an amplitude of the readback signal at a time corresponding to the guide edge measurement instruction and calculating the time offset in accordance with the amplitude.

The measurement instructions may also include an envelope measurement instruction (e.g., an instruction to measure an amplitude or other characteristic of the envelope of the readback signal). In an exemplary embodiment, the method includes storing a plurality of envelope amplitude measurements, calculating an envelope offset and/or an envelope gain in accordance with the envelope amplitude measurements, and further processing the readback signal in accordance with the envelope offset and/or the envelope gain.

The algorithms, computer program(s) and/or software, implementable and/or executable in systems equipped with a general purpose microprocessor and/or a conventional digital signal processor, may be configured to perform one or more steps of the method and/or one or more operations of the hardware described herein. The circuits, devices, apparatuses, architectures, and/or systems generally comprise those that include one or more components embodying one or more of the inventive concepts disclosed herein.

The present invention advantageously provides the ability to flexibly set test parameters and to quickly and accurately test the write characteristics of a recordable or re-writable optical storage medium. The present invention further provides for effective correction of a readback signal (e.g., reduction of jitter in time and/or amplitude) while reading data that may have been written under a variety of conditions (e.g., calibration pattern data written to the optical storage medium using several different writing power levels, timing offsets, etc.). Thus, the present invention provides for highly stable measurement of variations in the readback signal. These and other advantages of the present invention will become readily apparent from the detailed description of preferred embodiments below.

DETAILED DESCRIPTION OF EMBODIMENTS

Figure 1:
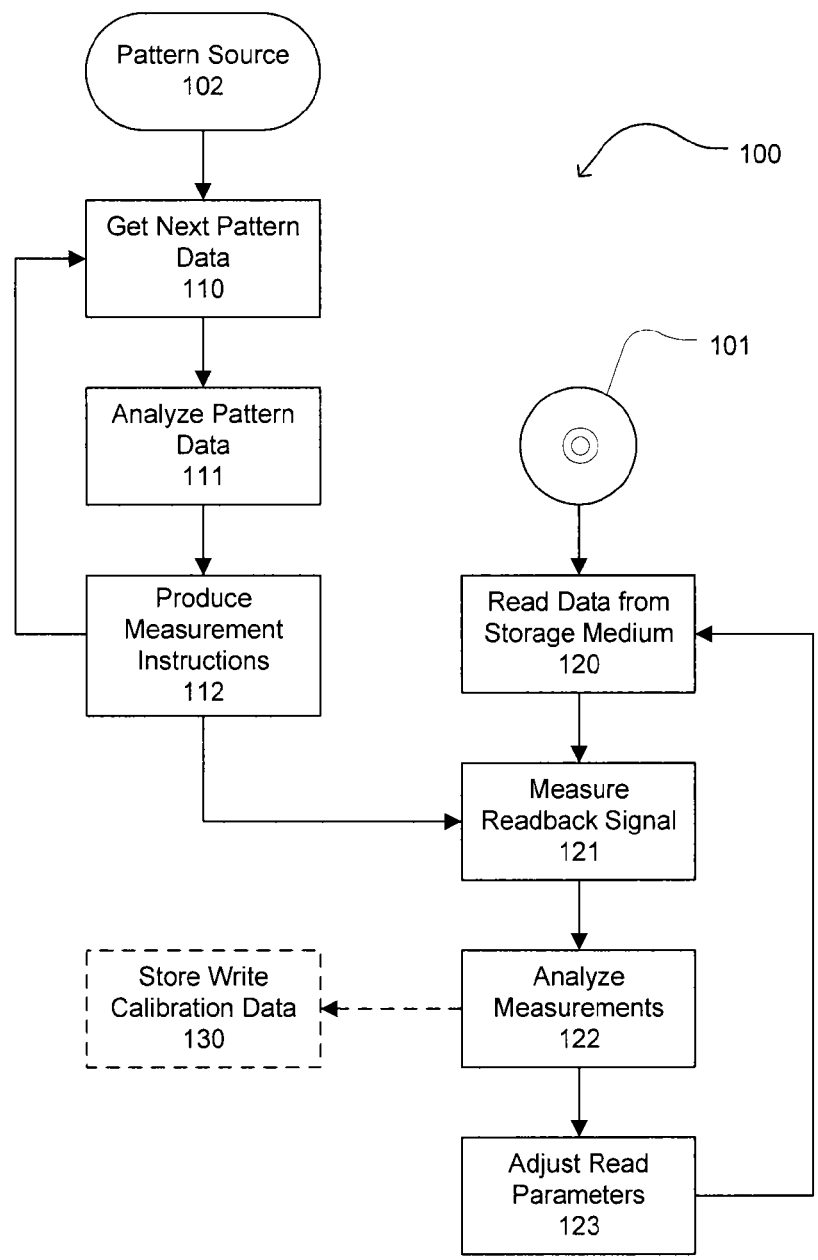
FIG. 1 is a flowchart of an exemplary method according to an embodiment of the present invention.

Reference will now be made in detail to various embodiments of the invention, examples of which are illustrated in the accompanying drawings. While the invention will be described in conjunction with the disclosed embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "bitstream," "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

Finally, the terms "mark," "space," "pit," and "land" generally refer to features written (and/or not written) onto a recordable optical storage medium, and may represent binary values and/or or other data encoded on the medium. The semantic values of "marks and spaces" and/or "lands and pits" may vary depending on the format of the optical storage medium, but these terms are generally given their art-recognized meanings.

The invention, in its various aspects, will be explained in greater detail below with regard to exemplary embodiments.

Exemplary Method for Timing Recovery

FIG. 1 shows an exemplary method 100 for reading data from an optical storage medium 101. Method 100 generally includes step 120 for reading a region of optical storage medium 101 to produce a readback signal, steps 110-112 for processing predetermined pattern data to produce one or more measurement instructions, step 121 for measuring one or more characteristics of the readback signal in response to the measurement instructions to produce one or more measurement results, and step 123 for adjusting reading parameters in accordance with one or more of the measurement results for further processing of the readback signal. In various embodiments, the optical storage medium 101 may comprise, for example, an optical disc such as a write-once optical disc (e.g., a CD-R, DVD-R, or DVD+R, BD-R, etc.) or a rewritable optical disc (e.g., a DVD-RW, DVD+RW, or DVD-RAM, BD-RE, etc.).

Method 100 begins at step 110 to get pattern data from pattern source 102. The pattern data is generally known prior to reading from the medium, so that the expected shape of the readback signal can be predicted. Thus, during or before step 120 of reading data from the storage medium a replica of the known written signal may be analyzed at step 111.

Figure 3:
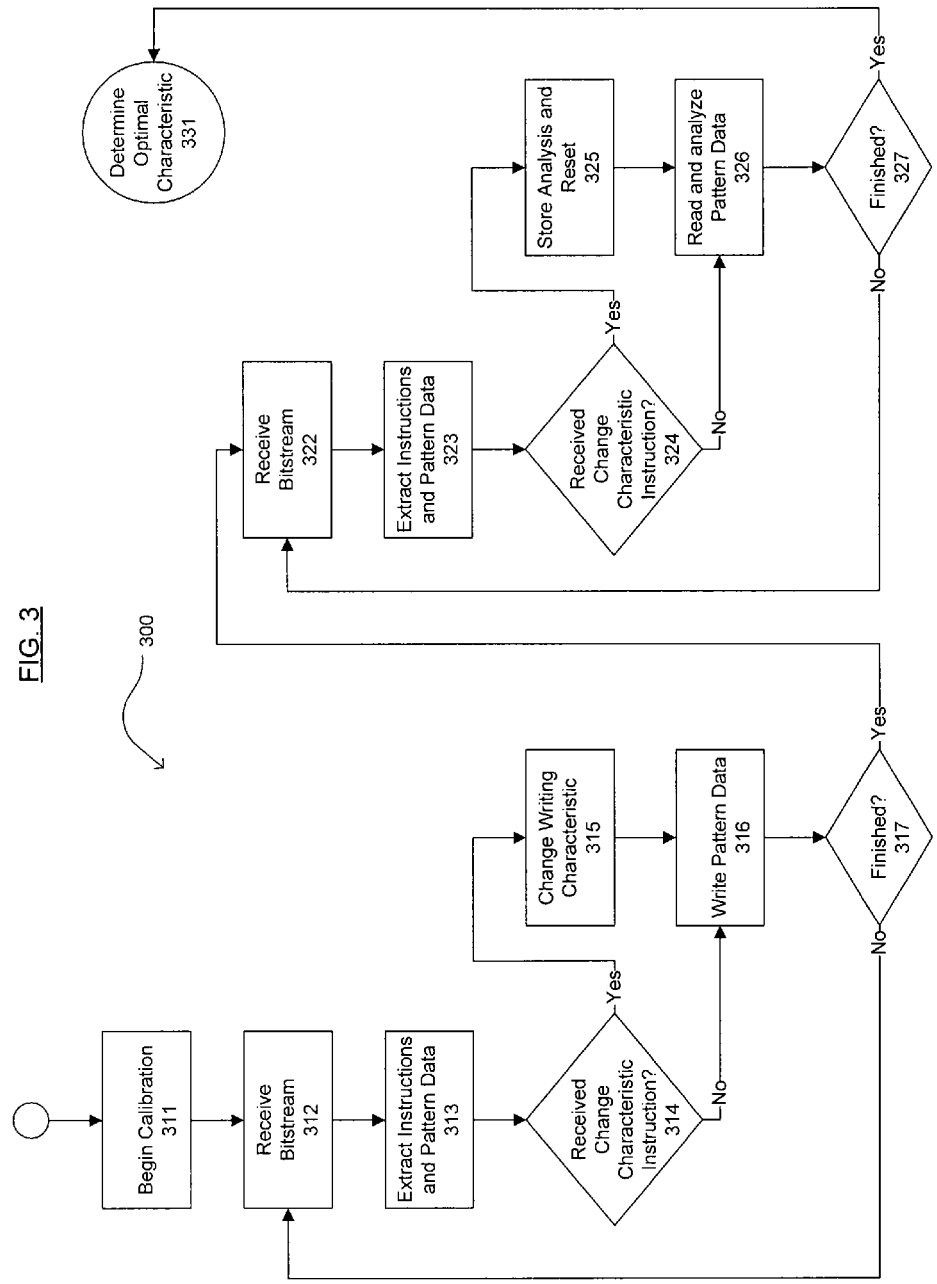
FIG. 3 is a flowchart of an exemplary method according to the present invention.

In one exemplary embodiment, the pattern data may have been written to medium 101 by a method 300 of FIG. 3 for writing pattern data to the optical storage medium using a variety of writing characteristics. Pattern source 102 may, for example, comprise a memory, (e.g., a memory that also provides the pattern data to be written to the optical storage medium), a process, circuit, or other means for generating the pattern data according to an algorithm, a buffer (e.g., a buffer that stores pattern data that was written to the optical storage medium 101), etc.

At step 111, the pattern data is analyzed to find useful measurement locations in the readback signal. For example, the pattern data may be analyzed to find particular run-lengths, mark/space combinations, etc. During optimal power calibration (OPC) operations, it is particularly important to obtain accurate measurements of the readback signal in order to select the best writing characteristics.

Conventional methods and devices for reading from an optical storage medium perform timing recovery to synchronize reading operations with the data read back from the medium. However, the OPC write process may make it more difficult to properly adjust the timing loop because the write characteristics (e.g., power, timing offset, etc.) used to write the data may vary considerably. Therefore it is desirable to stabilize jitter or other variations in the timing phase offset, envelope offset, and/or envelope gain of the readback signal.

Longer run-lengths of marks and/or spaces are likely to vary less than shorter run-lengths. As a result transitions between longer run-lengths (e.g., a transition between a 6T mark and a 6T space or vice versa) are likely to be more stable than transitions to or from shorter run-lengths. Thus, step 111 may include analyzing the pattern data to find such transitions. In addition to finding transition between long runs, step 111 may also include locating other transitions in the pattern data (e.g., to measure offsets for each type of transition in order to calibrate the writing characteristics) and/or to locate positions at or around the peak of each run (e.g., to measure variations in the envelope gain and/or offset).

At step 112, measurement instructions are produced in accordance with the analysis of step 111. The measurement instructions may comprise signals, operational codes, or other messages to measure one or more characteristics of the readback signal at a particular time (e.g., at a time when the readback signal is expected to correspond to one or more features of the pattern data). For example, the measurement instructions may include timing offset measurement instructions synchronized with an expected transition in the readback signal. Timing offset instructions may include guide edge measurement instructions synchronized with stable edges in the pattern data for adjusting the readback timing loop and/or other timing offset instructions (e.g., for calibrating write characteristics). The measurement instructions may also include envelope measurement instructions (e.g., instruction to measure an amplitude or other characteristic of the envelope of the readback signal) and/or instructions to measure other characteristics of the readback signal.

Figure 2:
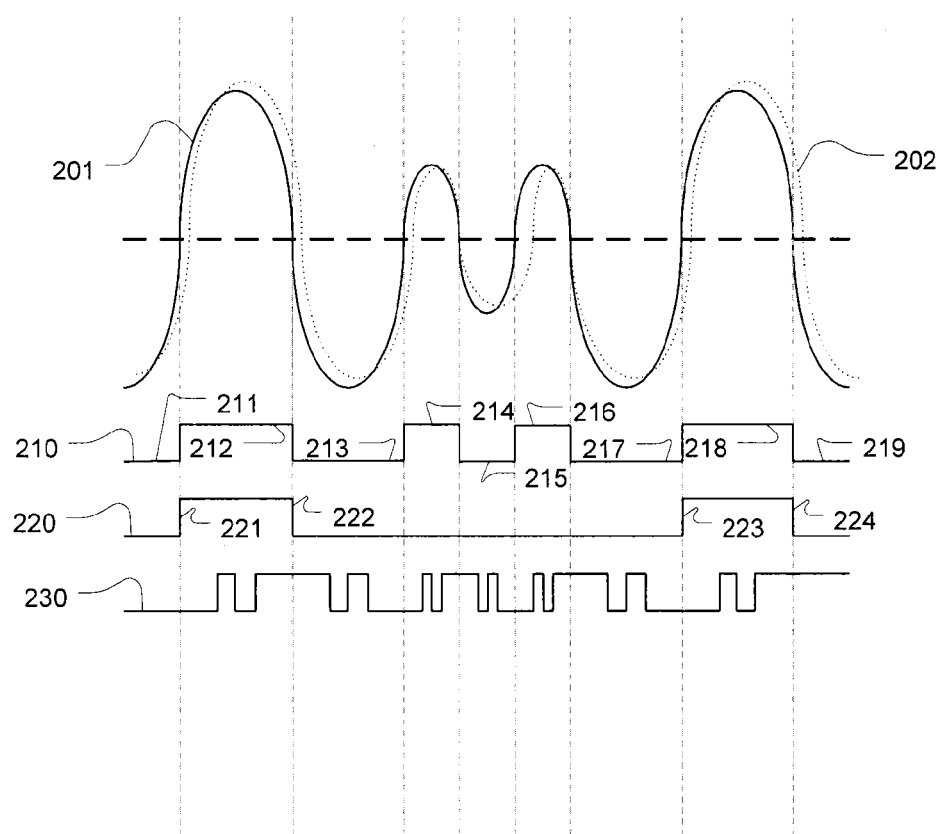
FIG. 2 is a diagram showing exemplary waveforms.

FIG. 2 shows an exemplary ideal readback signal waveform 201 that corresponds to pattern data 210. Waveform 202 is an exemplary readback signal with timing, envelope offset, and envelope gain variations. Marks 212 and 218 and spaces 211, 213, 218, and 219 each have 6T run-lengths. Marks 214 and 216 and space 215 each have 3T run-lengths.

Guide edge measurement signal 220 generally corresponds to instructions for measuring the timing offset of the readback signal in order to adjust the timing loop. Thus, guide edge 221 corresponds to a transition between 6T space 211 and 6T mark 212, guide edge 222 corresponds to a transition between 6T mark 212 and 6T space 213, guide edge 223 corresponds to a transition between 6T space 217 and 6T mark 218, and guide edge 224 corresponds to a transition between 6T mark 218 and 6T space 219. Envelope measurement signal 230 generally corresponds to instructions for measuring the envelope of the readback signal.

Referring again to FIG. 1, at step 121, characteristics of the readback signal are measured in accordance with the measurement instructions. Thus, step 121 may include measuring the timing offset of the readback signal at each edge of guide edge signal 220 (e.g., to measure the readback signal at edges 221, 222, 223, and 224 synchronized with relatively stable transitions in the pattern data to adjust the readback timing loop). Step 121 may also include measuring the timing offset at other expected transitions in the readback signal (e.g., for calibrating write characteristics), measuring an amplitude of the readback signal, and/or measuring any other characteristics of the readback signal. Measuring a time offset in the readback signal may, for example, include measuring an amplitude of the readback signal at a time corresponding to the guide edge measurement instruction and calculating the time offset in accordance with measured amplitude.

At step 122, the measurements produced at step 121 are analyzed. For example, step 122 may include storing a plurality of time offset measurements in accordance with the guide edge instructions to determine an adjustment for the readback timing loop. In other embodiments, step 122 may include storing a plurality of envelope amplitude measurements to calculate an envelope offset and/or an envelope gain for the readback signal in accordance with the envelope amplitude measurements, In some embodiments, step 122 may include analyzing one or more of the measurement values to determine optimal writing characteristics to calibrate the writing process, as described in further detail with respect to FIG. 3 herein and in U.S. application Ser. No. 11/646,098, filed Dec. 26, 2006. Thus, the method may include optional step 130 to store write calibration data (e.g., the optimal characteristics and/or data that will be used later to determine the optimal characteristics).

At step 123, the readback process 120 may be adjusted. For example, step 123 may include adjusting an output of a phase locked loop (PLL) in accordance with the guide edge measurements (e.g., to speed up or slow down the PLL to reduce jitter in the readback signal) and/or adjusting a gain or offset of the readback signal.

Thus, method 100 provides for using a synchronized replica of a known written pattern as a reference while readback of the pattern from an optical storage medium. The method can pre-determine that a sample represents a particular mark/space combination, and can be used to guide the timing recovery loop. When a stable edge is chosen as this guide edge, a very stable reference can be achieved, which is used to lock the timing loop. Other edges position, derived from the pattern data, may be used to determine where expected edges are for measurement (e.g., for write calibration). The pattern data may also be used to define signal positions that can be used to determine the signal envelope for gain and offset correction, further stabilizing the measurement.

Exemplary Method for Timing Recovery and Write Calibration

FIG. 3 shows a flowchart of an exemplary method 300 for writing pattern data using a variety of writing characteristics and reading from the optical storage medium to select optimal write characteristics. Calibration begins at step 311. At step 312, one or more segments (e.g., one or more codewords and merging bits) of a calibration bitstream containing both calibration pattern data and calibration instructions may be received (e.g., retrieved from a memory module or otherwise retrieved from a data storage device). Step 313 comprises extracting instructions and pattern data from the bitstream. The instructions are advantageously synchronized with the pattern data. Optionally, the pattern data are also corrected at this point.

At step 314, the instructions are checked to determine whether the test writing characteristics should be changed before writing the corresponding pattern data to the optical storage medium. If so, the test writing characteristic is changed at step 315. In either case, at step 316 the next block of pattern data may be written to the optical storage medium (e.g., to an OPC area on the medium, or to other free space on the medium). At step 317, the instructions may be checked to determine whether the writing process is finished. If not, steps 312 through 317 may be repeated until an appropriate instruction is reached.

After the write portion of the calibration is finished, the reading and measurement portion of the calibration begins. Generally, steps 322 through 327 comprise a loop, wherein the data written in steps 312 through 317 is retrieved from the optical storage medium as a readback signal, and characteristics of the readback signal are analyzed with respect to the pattern data and/or instructions stored in the calibration bitstream. Thus, at step 322, one or more segments of the calibration bitstream (e.g., the same calibration bitstream used in steps 312 through 317) may be retrieved from the optical storage medium (e.g., the OPC area on the medium). At step 323, the instructions and corrected pattern data may be extracted from the bitstream in the same manner as in step 313. At step 324, the instructions are checked to determine whether the writing characteristics were changed before the corresponding pattern data was written to the optical storage medium. If so, at step 325, the characteristics of the readback signal that were read in previous iterations of the loop (e.g., at step 326 as described below) may be stored (and may be associated with the previously used write characteristic), and any analysis module may be reset to correlate any further readback signals with the new writing characteristic.

In either case, at step 326 the next block of pattern data may be read from the optical storage medium (e.g., as a readback signal) and the signal may be analyzed with respect to the pattern data and/or instructions as extracted in step 323. For example, the characteristics of the readback signal may be analyzed to determine whether characteristics of the readback signal indicate an acceptable value for the most recently decoded write characteristic instruction(s). Step 326 may also include measuring and analyzing the pattern data in order to adjust readback parameters (e.g., timing offset, envelope gain, envelope offset, etc.) in order to process the readback signal, as described with respect to FIG. 1 and elsewhere herein.

At step 327, the instructions may be checked to determine whether the calibration process is finished. If not, steps 322, through 327 may be repeated until an appropriate instruction is reached. At step 331, after the final instruction is reached, an optimal write characteristic can be determined by finding the write characteristic that resulted in the most desirable characteristic(s) of the readback signal.

Thus, in a further embodiment, the writing step may further comprise changing a test value for the writing characteristic in response to at least one of the instructions, and writing some or all of the pattern data to the optical storage medium in accordance with the test value (see, e.g., steps 315 and 316 of method 300). In another embodiment, the processing step may comprise comparing the readback signal to an expected signal based on the pattern data and correlating a characteristic of the readback signal with at least one of the instructions (see, e.g., steps 325 and 326).

In one exemplary method of analyzing the readback signal, the asymmetry between the baseline of at least one high frequency component of the readback signal and the baseline of at least one low frequency component of the readback signal may be measured for each value of the write characteristic. For example, various power levels of the write laser may result in more asymmetry or less asymmetry between these values. In one embodiment, the baselines are determined from a plurality of high frequency components and a plurality of low frequency components of the readback signal.

Figure 4:
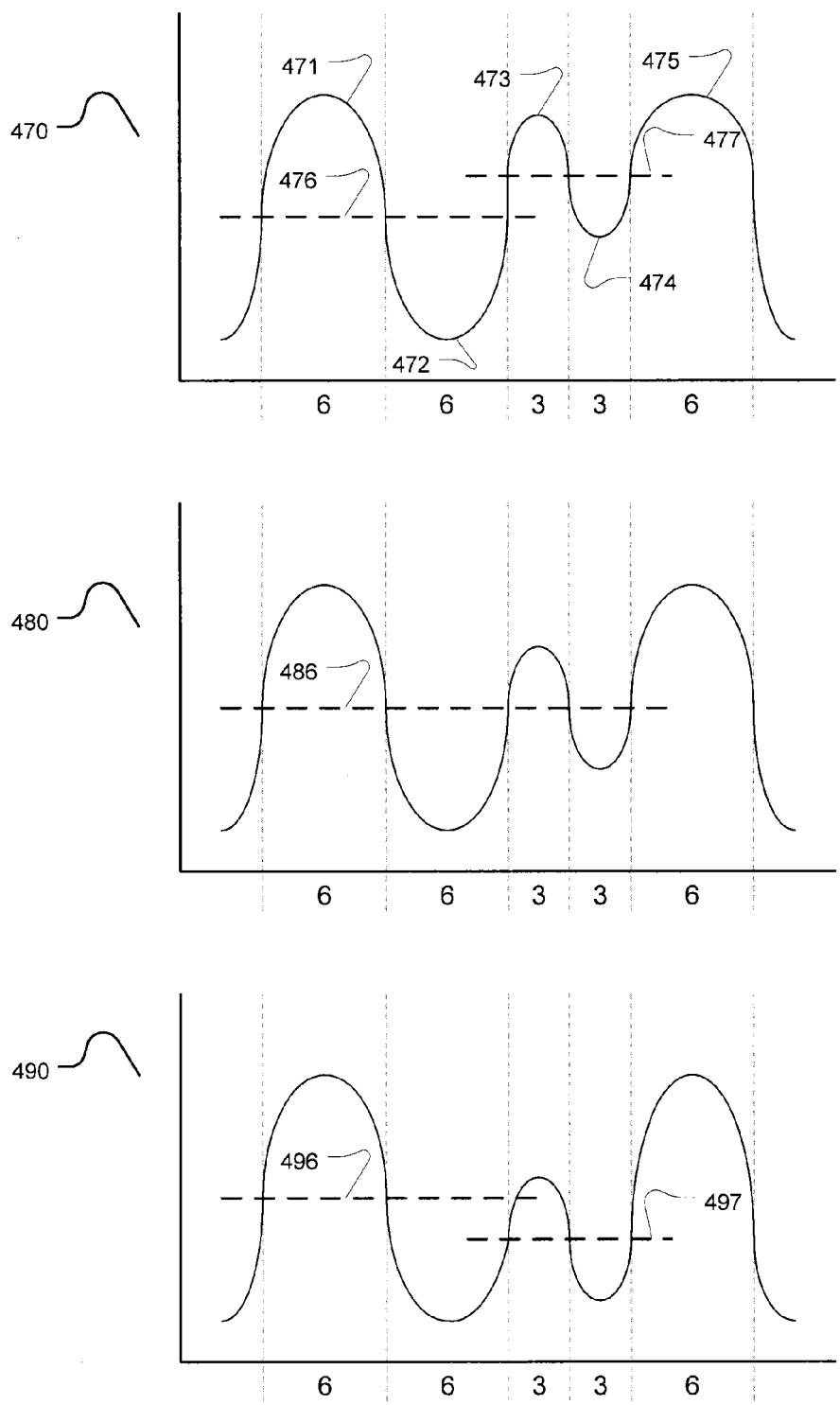
FIG. 4 is a diagram showing exemplary readback waveforms.

Referring now to FIG. 4, asymmetries in these baselines for three different write power levels are shown. In each of the readback signals 470, 480, and 490, the reflectance of the optical storage medium is shown for regions of the medium containing a land of six bit periods (6T) (e.g., 6T land 471), followed by a 6T pit (e.g., 6T pit 472), a 3T land (e.g., 3T land 473), a 3T pit (e.g., 3T pit 474), and a 6T land (e.g., 6T land 475). The transitions from a 6T pit to a 6T land (or vice versa) may constitute relatively low frequency components of the readback signal. The transitions from a 3T pit to a 3T land (or vice versa) may constitute a relatively high frequency component of the readback signal. While the number of bit periods determining low and high frequency components may be selected empirically for a given system and/or application, in general, a high frequency component may comprise a sequence of at least two consecutive pits and lands, each having a period of ≤5T. In some embodiments, the high frequency component contains pits and lands having a period of 3T or ≤4T. Similarly, in general, a low frequency component may comprise a sequence of at least two consecutive pits and lands, none of which has a high frequency component period. In various embodiments, the low frequency component contains pits and lands having a period of ≥4T, 5T or 6T.

The baseline of each of these components is generally the average of the high points of the component (e.g., the local maxima of the readback signal) and the low points of the component (e.g., the local minima of the readback signal). The difference between the baselines of the low frequency and high frequency components is the "asymmetry" of the readback signal. Thus, in readback signal 470, the low frequency component has baseline 476, and the high frequency component has a higher baseline 477. In readback signal 480, both components have baseline 486 (e.g., the asymmetry is at or near zero). In readback signal 490, the low frequency component has baseline 496, and the high frequency component has a lower baseline 497. Therefore, the write power level that resulted in readback signal 480 has the lowest asymmetry of the three examples in FIG. 4, and that write power level is generally considered to be the "optimal" write characteristic for the optical storage medium.

Thus, in a further embodiment, the method may comprise correlating the characteristic of the readback signal with one or more run lengths in the pattern data (e.g., with 6T run-lengths and 3T run-lengths, as shown in FIG. 4). In a still further embodiment, the characteristic of the readback signal may comprise asymmetry between a baseline of at least one high frequency component of the readback signal (e.g., baseline 477 of FIG. 4) and a baseline of at least one low frequency component of the readback signal (e.g., baseline 476 of FIG. 4).

The determining step may comprise selecting an optimal value of the writing characteristic based on a test value that correlates to a lowest asymmetry between the baselines (e.g., determine which write power level resulted in readback signal 480). It will be recognized that once an optimal value of the writing characteristic has been determined, the method may further comprise writing data to the optical storage medium in accordance with the determined value of the writing characteristic.

In one embodiment, the method comprises an optimal power calibration (OPC) method, so that the writing characteristic to be tested is the writing power level. However, it will be recognized that the inventive concepts presented herein are not limited to calibrating the write power level, and the present methods may be adapted for testing other writing characteristics, such as timing compensation (e.g., for the write strategy).

In another embodiment, the method may be used to measure a timing phase error. Whenever there is a transition in the readback signal (e.g., the value of the signal switches from mark to space or space to mark, where marks and spaces represent binary values in the optical storage medium) the value of the signal will cross a zero line. When the signal crosses the zero line early or late, this is a timing phase error. It is desirable to determine an optimal timing phase offset for writing, so that the timing phase error on readback can be minimized. Thus, the method may include selecting an optimal timing phase offset for writing to the medium by measuring a plurality of timing phase errors in the readback signal, and selecting a timing phase offset that results in the lowest measured timing phase error. Measurements of the timing phase errors (e.g., in response to a guide edge signal) may also be used to adjust reading parameters (e.g., clock speed, envelope gain and offset, etc.) to increase the accuracy of the calibration measurements described herein (e.g., as described with respect to FIG. 1 and elsewhere herein).

The timing phase error may vary depending on the run-length of the values before and after the transition. For example, the timing phase error for a 3T mark following by a 6T space may be different than the timing phase error for a 5T space following by a 4T mark. Therefore, it is desirable to determine the optimal timing phase offset for each transition type, where there is a transition type for each combination of transitions between one run-length of marks followed by another run-length of spaces, and vice versa. For example, if the maximum run-length of the encoding system is 10, then 200 different optimal timing phase offsets may be required (because there are 100 combinations of run lengths possible, and two different transition directions [e.g., "mark" to "space" and "space" to "mark"] are possible). Therefore, in another embodiment the determining step comprises selecting an optimal timing phase offset for each transition type in said pattern data. The optimal timing phase offset may then be used when writing data to the disk to adjust the timing of transitions (e.g., to turn the write laser on and off at the optimal time).

In a further embodiment, the processing step further comprises storing to memory a timing phase error value for each transition in said pattern data. To determine the optimal timing phase offset for writing, these stored values may be processed to determine a mean timing phase error for each transition type. For example, when processing the stored value to determine optimal writing characteristics, both the pattern data and the stored timing phase error values may be read from memory. Thus, the timing phase error values can be correlated with the transition type, and a histogram of timing phase errors for each transition type can be created. The histogram can be analyzed to determine the optimal timing phase offset for writing each transition type. In addition, the data can provide valuable insight into writing characteristics such as jitter (e.g., when there is statistically significant variation in the timing phase error for a transition type). A person skilled in the art can select pattern data to gather the most necessary information. For example, the pattern data may contain a relatively large number of high frequency transitions and a relatively low number of low frequency transitions, because high frequency transitions are more commonly written.

Exemplary Software

The present invention also includes algorithms, computer programs, and/or software, implementable and/or executable in or by an apparatus containing a microcontroller, microprocessor or other instruction processor (e.g., a general purpose computer or workstation equipped with a conventional analog and/or digital signal processor), configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD (e.g., CD-ROM, CD-R, CD-RW, etc.), DVD (e.g., DVD-ROM, DVD-R, DVD+R, DVD-RW, DVD+RW, etc.), magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device, or application-specific [integrated] circuit).

In various embodiments, the computer-readable medium or waveform comprises at least one instruction to receiving calibration instructions and pattern data, wherein the instructions are synchronized with the pattern data (e.g., where both calibration instructions and pattern data are encoded in a single bitstream, or where the calibration instructions and pattern data have been previously extracted from such a bitstream). The waveform or medium may further include instructions to write the pattern data to the optical storage medium in accordance with the calibration instructions, and to read a readback signal corresponding to the pattern data from the optical storage medium. In addition, the waveform or medium may include the instructions necessary to processing the readback signal in accordance with the calibration instructions, and/or to determine a writing characteristic for the optical storage medium based at least in part on the readback signal, in accordance with the methods disclosed herein.

In another embodiment, the computer-readable medium or waveform may comprise instructions for encoding pattern data and calibration instructions for calibrating a writing characteristic for writing data to an optical storage medium. At least one of the calibration instructions generally comprises an instruction for setting a test value for the writing characteristic. The computer-readable medium or waveform may include instructions for (a) encoding the pattern data according to a run length limited (RLL) constraint, and (b) producing a bitstream comprising the pattern data and the calibration instructions by encoding the calibration instructions in violation of the run length constraint of the pattern data.

Exemplary Apparatuses

Figure 5A:
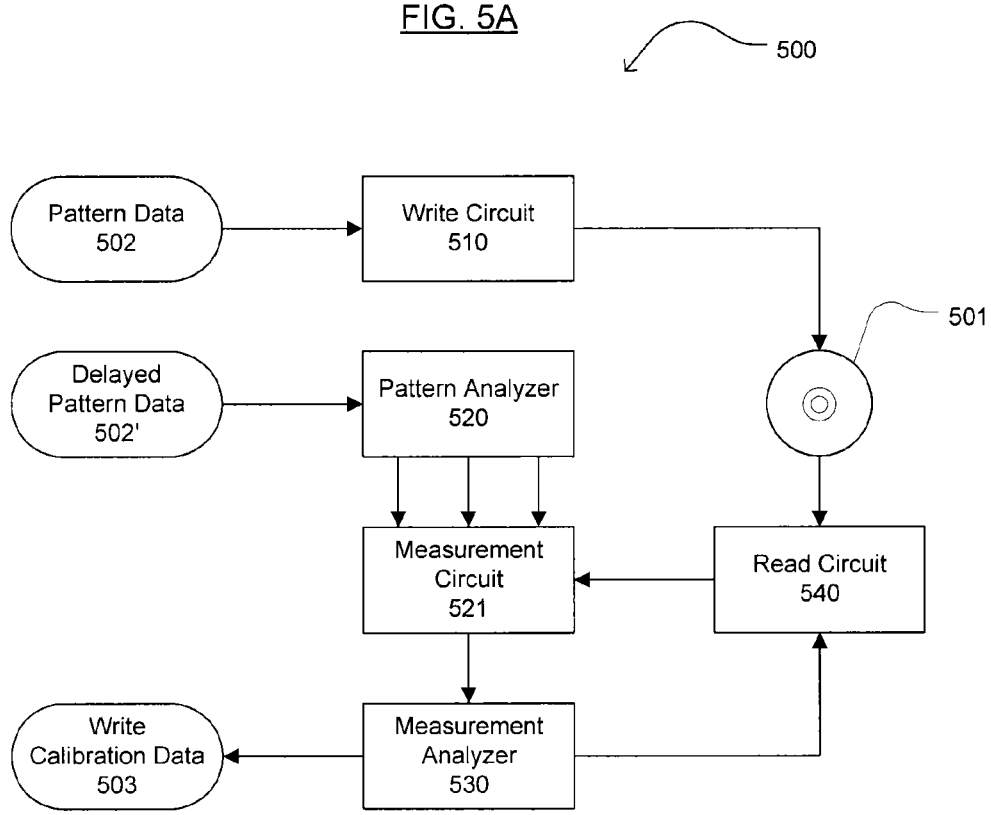
FIG. 5A is a diagram showing an exemplary apparatus according to an embodiment of the present invention.

FIG. 5A shows an apparatus 500 for writing to and/or reading from an optical storage medium 501. Write circuit 510 is configured to obtain pattern data from pattern source 502 and write the pattern data to optical storage medium 501. Read circuit 540 is configured to read the region of optical storage medium 501 that contains the pattern data and to produce a readback signal. Pattern analyzer 520 is configured to receive pattern data from pattern source 502' and to produce one or more measurement instruction signals in response to the pattern data.

The pattern data from pattern source 502' is generally a replica of pattern data from pattern source 502, synchronized with the data being read by read circuit 520 (e.g., so that pattern analyzer 520 has time to analyze the replica of the pattern data before the pattern is actually read from medium 501). Pattern sources 502 and/or 502' may, for example, comprise a memory, (e.g., a memory that also provides the pattern data to be written to the optical storage medium), a process, circuit, or other means for generating the pattern data according to an algorithm, a buffer (e.g., a buffer that stores pattern data that was written to the optical storage medium 101), etc. Pattern sources 502 and/or 502' may comprise the same device and/or region of a device, or may comprise distinct devices and/or distinct regions of a device (e.g., different memory locations).

Measurement circuit 521 is configured to measure one or more characteristics of the readback signal in response to the measurement instruction signals to produce one or more measurement results. Measurement analyzer 530 is configured to determine adjustments for more or more reading characteristics (e.g., characteristics for read circuit 540) in response to the measurement results.

In various embodiments, the optical storage medium 501 may comprise, for example, an optical disc such as a write-once optical disc (e.g., a CD-R, DVD-R, or DVD+R, BD-R, etc.) or a rewritable optical disc (e.g., a DVD-RW, DVD+RW, or DVD-RAM, BD-RE, etc.).

Apparatus 500 generally provides for using a synchronized replica of a known written pattern 502 as a reference while readback of the pattern from an optical storage medium 501. Pattern analyzer 520 can pre-determine that a sample represents a particular mark/space combination, and can be used to guide a timing recovery loop in or coupled to read circuit 540. When a stable edge is chosen as this guide edge, a very stable reference can be achieved, which is used to lock the timing loop. Other edge positions, derived from the pattern data, may be used to determine where expected edges are for measurement (e.g., for write calibration). The pattern data may also be used to define signal positions that can be used to determine the signal envelope for gain and offset correction, further stabilizing the measurement.

Measurement circuit 521 may be configured to the timing offset of the readback signal at each edge of guide edge signal 220 (e.g., to measure the readback signal from read circuit 540 (e.g., at edges 221, 222, 223, and 224 of FIG. 2, synchronized with relatively stable transitions in the pattern data to adjust the readback timing loop). Measurement circuit 521 may also be configured to measure the timing offset at other expected transitions in the readback signal (e.g., for calibrating write characteristics), an amplitude of the readback signal, or any other characteristics of the readback signal. Measuring a time offset in the readback signal may, for example, include measuring an amplitude of the readback signal at a time corresponding to the guide edge measurement instruction and calculating the time offset in accordance with measured amplitude.

Measurement analyzer 530 may be configured to store (e.g., in a register, memory, etc.) a plurality of time offset measurements in accordance with the guide edge instructions to determine an adjustment for the readback timing loop. Measurement analyzer 530 may also be configured to store a plurality of envelope amplitude measurements to calculate an envelope offset and/or an envelope gain for the readback signal in accordance with the envelope amplitude measurements, In some embodiments, measurement analyzer 530 may be configured may include analyzing one or more of the measurement values to determine optimal writing characteristics to calibrate the writing process, as described in further detail with respect to FIG. 3 herein and in U.S. application Ser. No. 11/646,098, filed Dec. 26, 2006. Thus, measurement analyzer 530 may be configured to store write calibration data 503 (e.g., the optimal characteristics and/or data that will be used later to determine the optimal characteristics).

Figure 5B:
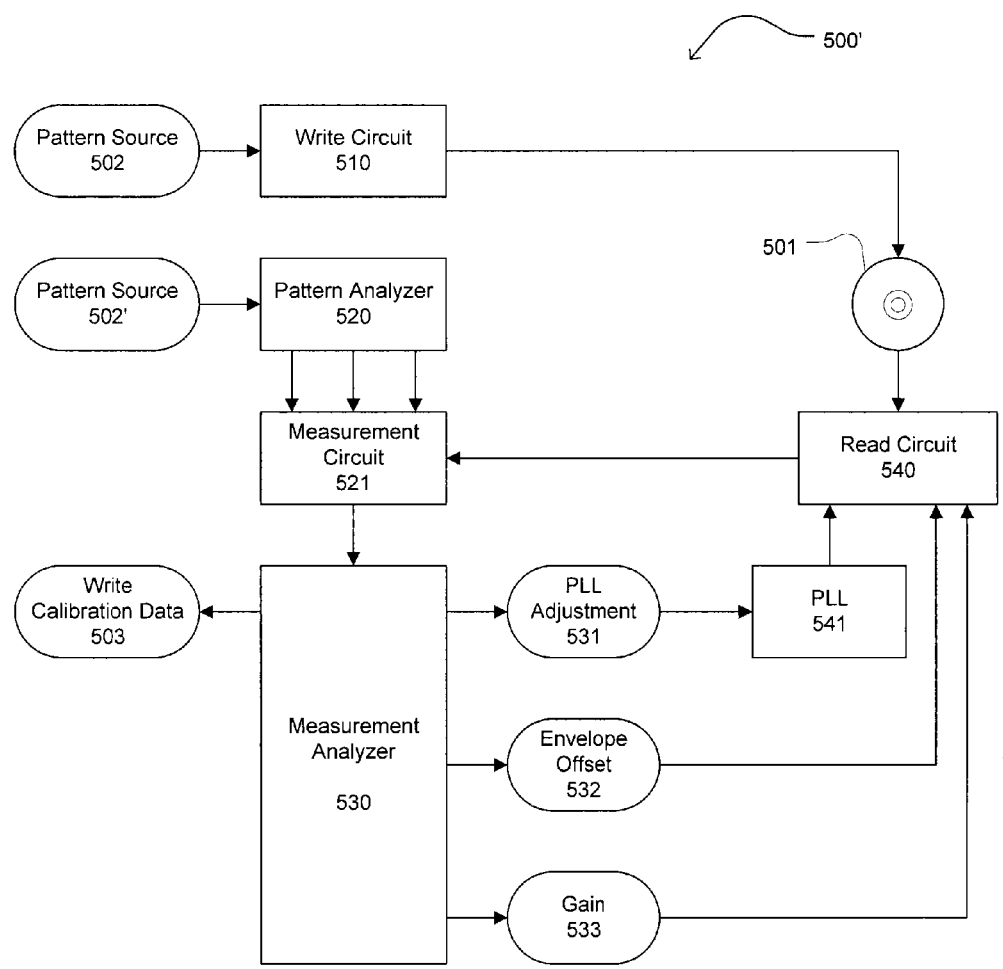
FIG. 5B is a diagram showing another exemplary apparatus according to an embodiment of the present invention.

FIG. 5B shows an apparatus 500'. The components of apparatus 500' generally correspond to the components of apparatus 500 having the same reference number. In apparatus 500', measurement analyzer 530 may produce PLL adjustment 531 to adjust an output of PLL 541 in accordance with the guide edge measurements. Thus, PLL adjustment 531 may include instructions and/or signals to speed up or slow down the operation of PLL 541, thereby correcting the timing loop of read circuit 540. Measurement analyzer 530 may also, for example provide envelope offset signal 532 for read circuit 540 to adjust an envelope offset of the readback signal and/or gain signal 533 for read circuit 540 to adjusting a gain of the readback signal.

Figure 6:
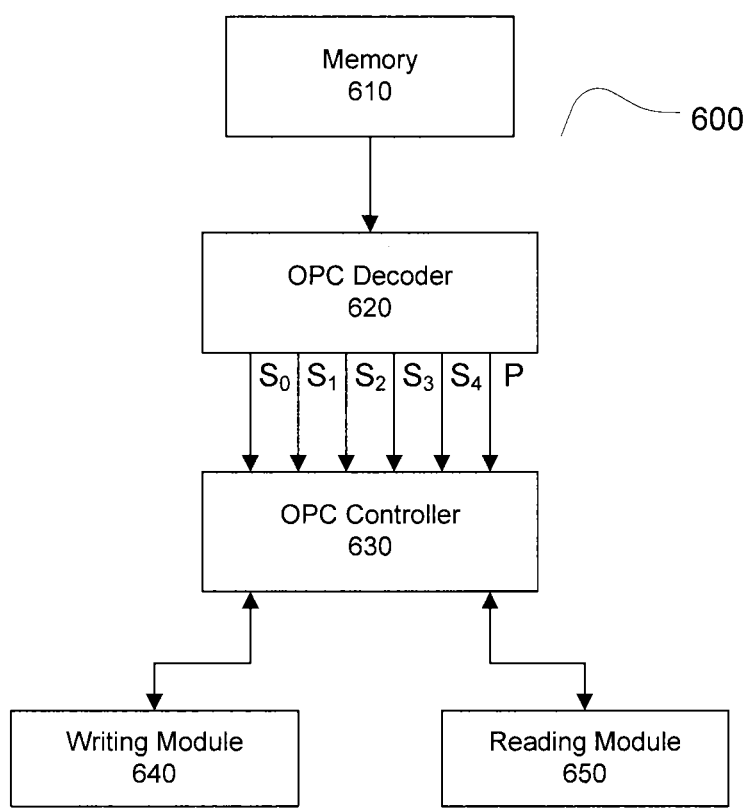
FIG. 6 is a diagram showing an exemplary apparatus for processing a calibration bitstream according to an embodiment of the present invention.

FIG. 6 shows an exemplary apparatus 600 for extracting pattern data and/or write instructions from a calibration bitstream. Thus, pattern sources 102, 502, and/or 502' as described herein may comprise apparatus 600. Memory 610 is generally configured to store data corresponding to a calibration bitstream. Memory 610 may comprise random access memory (RAM), nonvolatile memory such as flash memory, read only memory (ROM), and/or other suitable electronic data storage. Memory 610 generally provides the calibration bitstream to OPC decoder 620 (e.g., via a parallel data bus and/or a serial communications channel).

OPC decoder 620 is generally configured to extract calibration pattern data and calibration instructions from the calibration bitstream. The calibration instructions may be substantially synchronized with the calibration pattern data. Therefore, OPC decoder 620 may provide a plurality of output signals $S_0$ through $S_4$ corresponding to instructions encoded with the pattern data, as well as signal P corresponding to the pattern data. A person skilled in the art will recognize that OPC decoder 620 may be efficiently implemented with dedicated circuitry (e.g., in an application specific integrated circuit, or in a functional circuit block within a larger integrated circuit receiving and/or processing data from memory 610 or from a larger memory containing memory 610), but may also be implemented in software for a microcontroller or microprocessor.

OPC controller 630 may receive signals $S_0$ through $S_4$ and pattern data P, and control write module 640 and read module 650 to determine an optimal write characteristic using the instructions and pattern data. OPC controller 630 may, with write module 640, perform steps 314 through 317 of method 300. Furthermore, OPC controller 630 may, with read module 640, perform write calibration steps 324 through 330 of method 300 and/or read parameter adjustment operations 110-130 of method 100.

Exemplary Systems

Figure 7A:
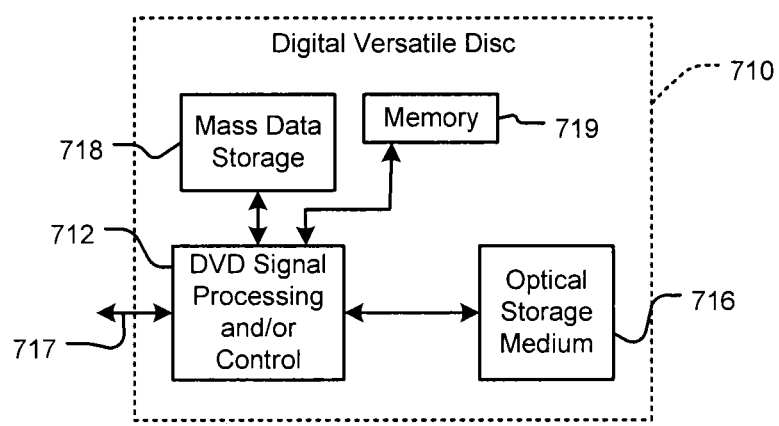
FIG. 7A is a diagram of an exemplary digital versatile disc (DVD) player.

Referring now to FIG. 7A, the present invention can be implemented in a digital versatile disc (DVD) drive 710. For example, the present invention may be implemented in mass data storage of the DVD drive 710. The signal processing and/or control circuit 712 and/or other circuits (not shown) in the DVD 710 may process data, perform coding and/or encryption, perform calculations, and/or format data that is read from and/or data written to an optical storage medium 716. In some implementations, the signal processing and/or control circuit 712 and/or other circuits (not shown) in the DVD 710 can also perform other functions such as encoding and/or decoding and/or any other signal processing functions associated with a DVD drive.

The DVD drive 710 may communicate with an output device (not shown) such as a computer, television or other device via one or more wired or wireless communication links 717. The DVD 710 may be connected to memory 719 such as RAM, ROM, nonvolatile memory such as flash memory and/or other suitable electronic data storage.

Figure 7B:
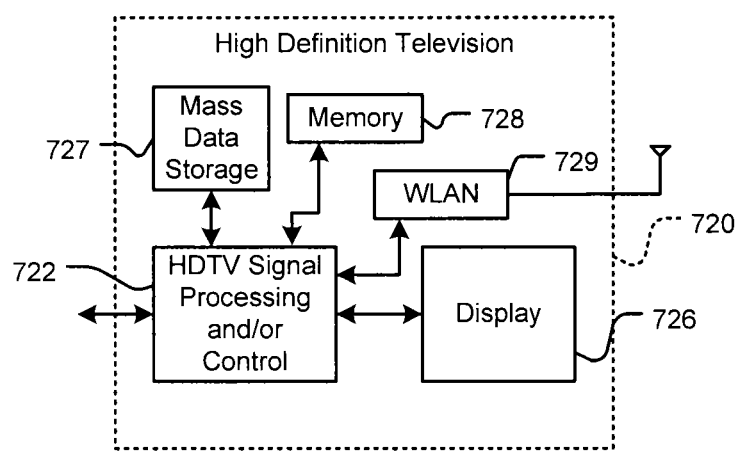
FIG. 7B is a diagram of an exemplary high definition television (HDTV).

Referring now to FIG. 7B, the present invention can be implemented in a high definition television (HDTV) 720. The present invention may be implemented in mass data storage of the HDTV 720. The HDTV 720 receives HDTV input signals in either a wired or wireless format and generates HDTV output signals for a display 726. In some implementations, signal processing circuit and/or control circuit 722 and/or other circuits (not shown) of the HDTV 720 may process data, perform coding and/or encryption, perform calculations, format data and/or perform any other type of HDTV processing that may be required.

The HDTV 720 may communicate with mass data storage 727 that stores data in a nonvolatile manner such as optical and/or magnetic storage devices. Mass data storage may include at least one DVD or other optical storage device having the configuration shown in FIG. 7A. The HDTV 720 may be connected to memory 728 such as RAM, ROM, nonvolatile memory such as flash memory and/or other suitable electronic data storage. The HDTV 720 also may support connections with a WLAN via a WLAN network interface 729.

Figure 7C:
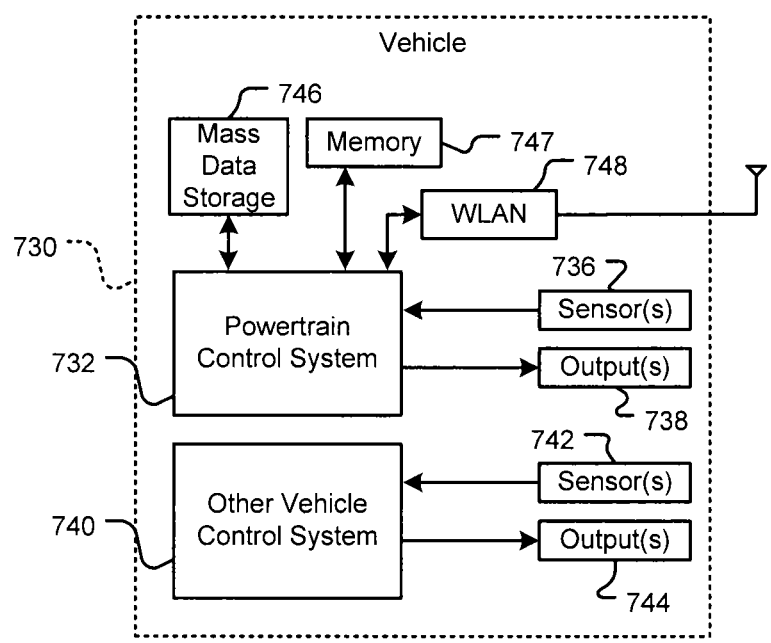
FIG. 7C is a diagram of an exemplary vehicle control system.

Referring now to FIG. 7C, the present invention can be implemented in a control system of a vehicle 730. For example, the present invention may be implemented in mass data storage of the vehicle control system 730. In some implementations, the vehicle control system includes a powertrain control system 732 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 740 of the vehicle 730. The control system 740 may likewise receive signals from input sensors 742 and/or output control signals to one or more output devices 744. In some implementations, the control system 740 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 732 may communicate with mass data storage 746 that stores data in a nonvolatile manner. The mass data storage 746 may include optical and/or magnetic storage devices (for example, hard disk drives [HDDs] and/or DVDs). At least one DVD may have the configuration shown in FIG. 7A. The powertrain control system 732 may be connected to memory 747 such as RAM, ROM, nonvolatile memory such as flash memory and/or other suitable electronic data storage. The powertrain control system 732 also may support connections with a WLAN via a WLAN network interface 748. The control system 740 may also include mass data storage, memory and/or a WLAN interface (all not shown).

Figure 7D:
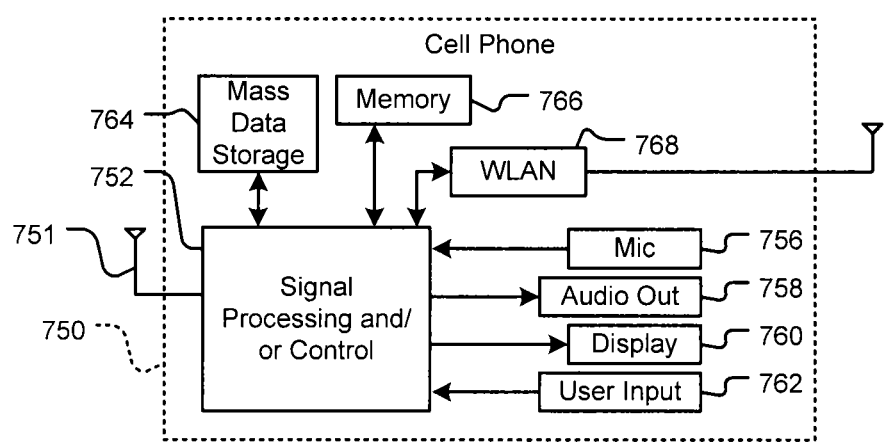
FIG. 7D is a diagram of an exemplary cellular or mobile phone.

Referring now to FIG. 7D, the present invention can be implemented in a cellular phone 750 that may include a cellular antenna 751. For example, the present invention may be implemented in mass data storage of the cellular phone 750. In some implementations, the cellular phone 750 includes a microphone 756, an audio output 758 such as a speaker and/or audio output jack, a display 760 and/or an input device 762 such as a keypad, pointing device, voice actuation and/or other input device. The signal processing and/or control circuits 752 and/or other circuits (not shown) in the cellular phone 750 may process data, perform coding and/or encryption, perform calculations, format data and/or perform other cellular phone functions.

The cellular phone 750 may communicate with mass data storage 764 that stores data in a nonvolatile manner such as optical and/or magnetic storage devices (for example, hard disk drives [HDDs] and/or DVDs). At least one DVD may have the configuration shown in FIG. 7A. The cellular phone 750 may be connected to memory 766 such as RAM, ROM, nonvolatile memory such as flash memory and/or other suitable electronic data storage. The cellular phone 750 also may support connections with a WLAN via a WLAN network interface 768.

Figure 7E:
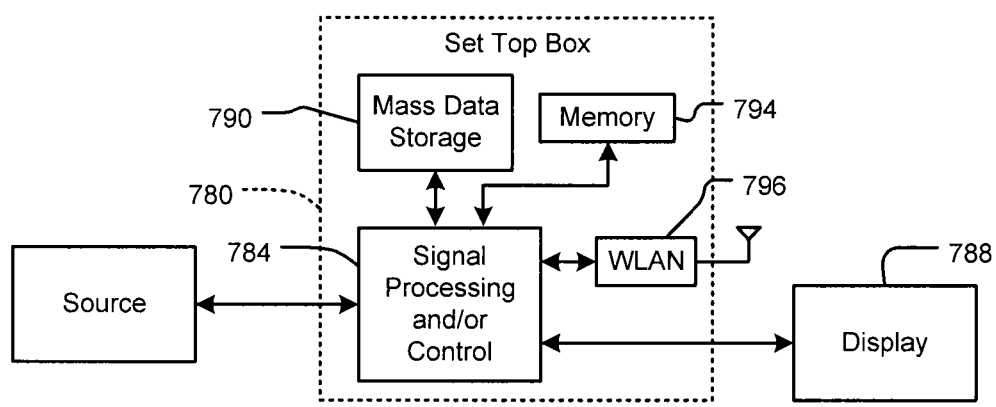
FIG. 7E is a diagram of an exemplary television set top box.

Referring now to FIG. 7E, the present invention can be implemented in a set top box 780. For example, the present invention may be implemented in mass data storage of the set top box 780. The set top box 780 receives signals from a source such as a broadband source and outputs standard and/or high definition audio/video signals suitable for a display 788 such as a television and/or monitor and/or other video and/or audio output devices. The signal processing and/or control circuits 784 and/or other circuits (not shown) of the set top box 780 may process data, perform coding and/or encryption, perform calculations, format data and/or perform any other set top box function.

The set top box 780 may communicate with mass data storage 790 that stores data in a nonvolatile manner. The mass data storage 790 may include optical and/or magnetic storage devices (for example, hard disk drives [HDDs] and/or DVDs). At least one DVD may have the configuration shown in FIG. 7A. The set top box 780 may be connected to memory 794 such as RAM, ROM, nonvolatile memory such as flash memory and/or other suitable electronic data storage. The set top box 780 also may support connections with a WLAN via a WLAN network interface 796.

Figure 7F:
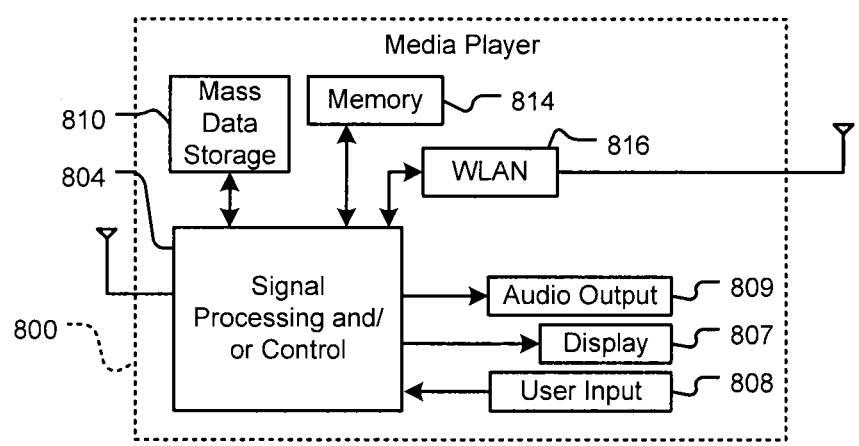
FIG. 7F is a diagram of an exemplary portable media player.

Referring now to FIG. 7F, the present invention can be implemented in a media player 800. For example, the present invention may be implemented in mass data storage of the media player 800. In some implementations, the media player 800 includes a display 807 and/or a user input 808 such as a keypad, touchpad and the like. In some implementations, the media player 800 may employ a graphical user interface (GUI) that typically employs menus, drop down menus, icons and/or a point-and-click interface via the display 807 and/or user input 808. The media player 800 further includes an audio output 809 such as a speaker and/or audio output jack. The signal processing and/or control circuits 804 and/or other circuits (not shown) of the media player 800 may process data, perform coding and/or encryption, perform calculations, format data and/or perform any other media player function.

The media player 800 may communicate with mass data storage 810 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one DVD may have the configuration shown in FIG. 7A. The media player 800 may be connected to memory 814 such as RAM, ROM, nonvolatile memory such as flash memory and/or other suitable electronic data storage. The media player 800 also may support connections with a WLAN via a WLAN network interface 816. Still other implementations in addition to those described above are contemplated.

CONCLUSION/SUMMARY

Thus, embodiments of the present invention provides methods, software, and apparatus for the calibration of writing characteristics for writing to an optical storage medium, and methods of encoding calibration pattern data and calibration instructions. Advantageously, a method and system are provided to flexibly set test parameters and to quickly and accurately test the write characteristics of a recordable or re-writable optical storage medium. Embodiments of the present invention further provide for effective correction of a readback signal (e.g., reduction of jitter in time and/or amplitude) while reading data that may have been written under a variety of conditions (e.g., calibration pattern data written to the optical storage medium using several different writing power levels, timing offsets, etc.). Thus, highly stable measurement of variations in the readback signal is possible.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method, comprising of:
reading a region of a storage medium to produce a readback signal, wherein the region includes predetermined pattern data;
receiving a replica of the pattern data;
measuring one or more characteristics of the readback signal based on the pattern data and the replica of the pattern data to produce one or more measurement results; and
processing the readback signal in accordance with the one or more measurement results.

2. The method of claim 1, further comprising:
processing the pattern data and the replica of the pattern data to produce one or more measurement instructions.

3. The method of claim 2, wherein processing the pattern data comprises finding a predetermined mark/space combination in the pattern data.

4. The method of claim 2, wherein measuring the one or more characteristics of the readback signal is performed in response to the one or more measurement instructions.

5. The method of claim 1, further comprising:
writing the pattern data to the region of the storage medium before reading the region of the storage medium.

6. The method of claim 1, further comprising:
writing the pattern data to the region of the storage medium in accordance with calibration instructions.

7. The method of claim 6, further comprising:
receiving a bitstream including the calibration instructions and the pattern data.

8. The method of claim 6, further comprising:
measuring the one or more of the characteristics of the readback signal in accordance with the calibration instructions.

9. The method of claim 6, wherein writing the pattern data further comprises:
changing a test value for a writing characteristic in response to at least one of the calibration instructions, the writing characteristic being calculated for writing data to the storage medium from the one or more measurement results; and
writing some or all of the pattern data to the storage medium in accordance with the test value.

10. The method of claim 1, further comprising:
calculating a writing characteristic for writing data to the storage medium from the one or more measurement results.

11. An apparatus, comprising:
a reading module configured to read a region of a storage medium to produce a readback signal, wherein the region includes pre-determined pattern data;
a pattern processing module configured to receive a replica of the pattern data;
a measurement module configured to measure one or more characteristics of the readback signal based on the pattern data and the replica of the pattern data to produce one or more measurement results; and
a controller configured to process the readback signal in accordance with the one or more measurement results.

12. The apparatus of claim 11, wherein the pattern processing module is further configured to process the pattern data and the replica of the pattern data to produce one or more measurement instructions.

13. The apparatus of claim 12, wherein the pattern processing module is further configured to find a predetermined mark/space combination in the pattern data.

14. The apparatus of claim 12, wherein the measurement module is further configured to measure the one or more characteristics of the readback signal in response to the one or more measurement instructions.

15. The apparatus of claim 11, further comprising:
a writing module configure to write the pattern data to the region of the storage medium before reading the region of the storage medium.

16. The apparatus of claim 11, further comprising:
a writing module configure to write the pattern data to the region of the storage medium in accordance with calibration instructions.

17. The apparatus of claim 16, further comprising:
a decoding module configured to receive a bitstream including the calibration instructions and the pattern data.

18. The apparatus of claim 16, wherein the measurement module is further configured to measure the one or more of characteristics of the readback signal in accordance with the calibration instructions.

19. The apparatus of claim 16, wherein the writing module is further configure to change a test value for a writing characteristic in response to at least one of the calibration instructions, the writing characteristic being calculated for writing data to the storage medium from the one or more measurement results, and write some or all of the pattern data to the storage medium in accordance with the test value.

20. The apparatus of claim 11, wherein the controller is further configured to calculate a writing characteristic for writing data to the storage medium from the one or more of the measurement results.

* * * * *